(12) United States Patent
Jans

(10) Patent No.: US 8,917,020 B2
(45) Date of Patent: Dec. 23, 2014

(54) TUBELAMP RETROFIT PIN SAFETY IMPLEMENTATION USING EXISTING BALLAST AND FIXTURE

(75) Inventor: William Peter Mechtildis Marie Jans, Born (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/006,358

(22) PCT Filed: Mar. 15, 2012

(86) PCT No.: PCT/IB2012/051222
§ 371 (c)(1),
(2), (4) Date: Oct. 24, 2013

(87) PCT Pub. No.: WO2012/127371
PCT Pub. Date: Sep. 27, 2012

(65) Prior Publication Data
US 2014/0055029 A1    Feb. 27, 2014

(30) Foreign Application Priority Data
Mar. 24, 2011 (EP) .................................... 11159493

(51) Int. Cl.
| | |
|---|---|
| *F21V 25/04* | (2006.01) |
| *F21V 23/04* | (2006.01) |
| *H05B 33/08* | (2006.01) |
| *F21K 99/00* | (2010.01) |
| *F21Y 101/02* | (2006.01) |
| *F21Y 103/00* | (2006.01) |

(52) U.S. Cl.
CPC ............. *F21V 25/04* (2013.01); *F21Y 2101/02* (2013.01); *H05B 33/0884* (2013.01); *Y02B 20/383* (2013.01); *H05B 33/0806* (2013.01); *F21K 9/17* (2013.01); *F21Y 2103/003* (2013.01); *F21V 23/04* (2013.01)
USPC .......................... 315/74; 315/127; 362/217.13

(58) Field of Classification Search
CPC ...... H05B 33/0884; F21V 25/04; F21V 23/04
USPC .................. 315/74, 127; 362/95, 221, 217.13
See application file for complete search history.

(56) References Cited

U.S. PATENT DOCUMENTS

| 4,211,958 A | 7/1980 | Bickford et al. | |
|---|---|---|---|
| 2010/0181178 A1* | 7/2010 | Chang et al. .................. | 200/341 |

(Continued)

FOREIGN PATENT DOCUMENTS

| CN | 201425280 Y | 3/2010 |
|---|---|---|
| CN | 101737664 A | 6/2010 |

(Continued)

*Primary Examiner* — Don Le
(74) *Attorney, Agent, or Firm* — Yuliya Mathis

(57) ABSTRACT

An electric lamp (1) has two pairs of external connection pins (5) adapted for connecting the lamp to a voltage source for powering an internal lighting module (3). Each pair of pins is disconnected from the lighting module by an open switch (6) unless a non-zero electric voltage is applied to the pair and causes the switch to close. The lamp is therefore safe to handle even in a condition where one pair of pins is connected and the other is not. The lamp may be fitted in a switch-start fixture, providing an ohmic connection between two pins in different pairs, as well as a rapid-start fixture, with a capacitive connection.

17 Claims, 2 Drawing Sheets

(56) References Cited

U.S. PATENT DOCUMENTS

| | | |
|---|---|---|
| 2011/0149563 A1* | 6/2011 | Hsia et al. ............ 362/221 |
| 2012/0300445 A1* | 11/2012 | Chu et al. ............ 362/217.13 |
| 2013/0234596 A1* | 9/2013 | Hollander ............ 315/90 |
| 2014/0177203 A1* | 6/2014 | Novak et al. ............ 362/95 |

FOREIGN PATENT DOCUMENTS

| | | |
|---|---|---|
| DE | 202010008186 U1 | 11/2010 |
| NL | 2002333 C | 6/2010 |
| WO | 2009067074 A1 | 5/2009 |
| WO | 2010069983 A1 | 6/2010 |

* cited by examiner

US 8,917,020 B2

TUBELAMP RETROFIT PIN SAFETY IMPLEMENTATION USING EXISTING BALLAST AND FIXTURE

FIELD OF THE INVENTION

The present invention generally relates to safety arrangements in electric retrofit devices. More precisely, it relates to a tube lamp retrofit with arrangements for preventing the occurrence of a harmful voltage at its external connection pins.

BACKGROUND OF THE INVENTION

Conventional tube lamps (fluorescent lamps) of the type having a two-pin connector at each end of the tube are, in steady-state operation, powered by a DC or AC electric current flowing between the connectors. The connectors are electrically disconnected until an arc has established in the tube. For this purpose, a starting procedure including preheating of the electrodes may be carried out by dedicated starting circuitry, which can be made inherently safe by being enabled only when the lamp is properly inserted into the fixture, so that live electric parts are always protected from touch. The starting circuitry may be of the switch-start/preheat, rapid-start or other type, and is commonly integrated in the fixture.

It is desirable to power a tube lamp retrofit in the same manner as the tube lamp it replaces, that is, by a current flowing between its end connectors. Depending on the internal circuitry of the lamp, potentially hazardous conditions may arise when the lamp is partially inserted or partially removed from the fixture. Among the attempts to solve this problem, CN 101737664 A proposes a lamp with a protection switch actuated by an external push button located next to a pair of external connection pins. When the push button is depressed, which normally occurs only at proper insertion of the connection pins into a socket, the protection switch connects one of the pins to the electrical components within the lamp. However, such external push button may be easily tampered with using everyday articles.

SUMMARY OF THE INVENTION

It is an object of the present invention to overcome this problem, and to provide an inherently safe electric lamp to be fitted in a tube lamp fixture. It is a particular object to provide an electric lamp wherein external connection pins accessible to touch are never electrically live in normal use conditions.

Accordingly, the invention provides an electric lamp and a method of operating such lamp with the features set forth in the independent claims. The dependent claims define advantageous embodiments of the invention.

In a first aspect of the invention, there is provided an electric lamp comprising a lighting module with two or more terminals and further comprising at least four external connection pins arranged in pairs. The invention achieves its object of providing an inherently safe electric lamp by the fact that an automatic switch is operable to connect a connection pin in each pair of pins to a corresponding terminal on the lighting module and by the fact that the automatic switch is adapted to close in response to a non-zero voltage at a pair of connection pins. Thus, no permanent connection exists between any two connection pins belonging to different pairs, and they are not permanently connected to the lighting module, which might in some circumstances act as an electric connection. In normal use situations, a non-zero voltage is only present when the pair of pins are inserted in a supply-voltage socket (or outlet). Hence, the lighting module may only act as an electric connection between pins belonging to different pairs when both pairs of pins are inserted into respective sockets at the same time, that is, when neither pair of pins is exposed to touch.

It is possible to configure automatic switches that react only to voltages above a predefined threshold level, such as a voltage of the same order as a mains voltage for which the lamp is intended. This further increases the safety of the device. An automatic switch is preferably adapted to open the electric circuit when the voltage at the concerned pair of connection pins decreases to zero and may do so by interrupting the connection between a connection pin and a terminal. Similarly, the automatic switch may also be adapted to open the circuit when the voltage goes below a predefined voltage. Suitably, the automatic switch reacts to a voltage drop in short time. The automatic switch may react as fast as a normal residual current circuit breaker does, that is, the non-inserted pair of connection pins should be safe to touch after no more than a few tens of milliseconds.

Embodiments of the invention may include electrically operated automatic switches. As such, they may include voltage sensing means arranged between the connection pins in the pair with which the switch is associated. The voltage sensing means may be adapted to sense DC and/or AC voltages, depending on the intended use of the lamp. One voltage sensing unit may control switches operable to connect two or more combinations of a connection pin and a terminal. It is beneficial safety-wise to select the voltage sensing means as a component with high internal impedance, which largely prevents currents flowing between the pins. This is generally desirable from the point of view energy efficiency as well.

In particular, an automatic switch may be provided in the form of an electric relay. As already noted, a relay may control several potential electric connections on the basis of a single measured voltage; hence, a relay may act as a plurality of automatic switches in embodiments of the present invention. The input terminals of the relay may be ohmically connected to the connection pins in a pair. The relay may be of a type known per se, such as an electromechanical, an electromagnetic (e.g., Reed relay), electro-thermal (e.g., bimetal) or a solid-state type. In the interest of safety, the relay is preferably of a normally-open type, that is, one acting as an open circuit in its non-energized condition.

An electric lamp according to the invention may be given improved compatibility in respect of a fixture designed to connect a tube lamp (fluorescent lamp), preferably a fixture of the switch-start type. Typically, the electric properties of such a fixture are adapted to suit a burn voltage (nominal burn voltage) of the tube lamp, that is, the lowest drive voltage at which the lamp is operable in steady state. Further, the fixture may have been modified by substituting a dummy starter, which provides an ohmic connection, in the place of a (glow) starter arranged between socket terminals intended to receive two pins belonging to opposite ends of the tube lamp. Hence, between those connection pins that are not connected via the dummy starter, current will flow two parallel ways: first, non-connected pin at first end—first relay—connected pin at first end—dummy starter—connected pin at second end—second relay—non-connected pin at second end; and second, non-connected pin at first end—terminal—lighting module—terminal—non-connected pin at second end. Hence, the first and second relays are effectively connected in series. It is assumed that the lighting module is adapted to operate at the burn voltage or above. The lighting module will be supplied with voltages in this range if the winding voltages (pick-up voltages) of the first and second relays are chosen so that their sum is the (nominal) burn voltage. In particular, the winding voltage of each relay may be chosen to be half the (nominal) burn voltage.

Further, in the case of a tube lamp (fluorescent lamp) retrofit, the connection pins are arranged in pairs, each of which is adapted to fit into a socket. To this end, the pins within a pair may have a fixed spatial configuration, including a fixed spacing and relative orientation. In turn, the pairs are rigidly arranged at a respective end of the lamp, so that the four connection pins have a spatially rigid configuration. This is advantageous from the point of view of safety, since the lamp may only be fully connected when it is correctly inserted into a specially adapted fixture. This means, internally, that the lighting module is fully connected to connection pins only during correct insertion of the lamp. As a consequence, externally, it is only during correct insertion in the fixture that two pins located at opposite ends of the lamp may possibly be put in electric contact via the lighting module. Hence, a non-inserted pin is electrically isolated from all pins at the other end of the lamp at all times.

The electric lamp may comprise a housing, which is preferably electrically isolating. The terminals of the lighting module may then be arranged inside the housing, where they are protected from touch. The external connection pins extend through the housing to meet the terminals, in the sense that an external pin portion is electrically connected to an internal pin portion via a conductive segment. Alternatively, the external and internal portions and the conductive segment are embodied as a single structural piece. The lighting module may be partially enclosed in the housing. It may also be arranged completely inside the housing if the latter is sufficiently light-transparent. A housing may comprise a plurality of housing sub-parts.

A pair of connection pins may include more than one connection pin that is connectable to a terminal of the lighting device. Two pins may be connectable to respective terminals of the lighting module. Alternatively, two pins may be connectable to a common terminal of the lighting module. If a further connection pin in pair is made connectable to a terminal, an automatic switch is operable to this electric connection. The automatic switch may respond to the same measurement as the automatic switch for connecting the first connection pin to a (common or different) terminal. In particular, two automatic switches associated with one pair may be implemented as a double-pole relay.

Further, the lamp may comprise four connection pins and the lighting module may have four terminals, wherein four automatic switches are provided, each switch being operable to connect a pin with a terminal in response to a non-zero voltage at the pair of pins to which the concerned pin belongs. It is repeated that the reference to a particular number of automatic switches is to be understood on a functional level, and that said switches may be embodied structurally as a smaller number of physical units.

The invention moreover provides a kit comprising a lamp with the features described hereinabove and a dummy starter for replacing a glow starter in a switch-start fixture. Functionally, the dummy starter establishes an electric connection between the connection points intended to receive the glow starter. The dummy starter may be fashioned as a conductor, with low impedance. It may also be designed to act as a ballast, with a resistance and/or reactance that are appropriate in view of certain electric properties, in particular to give the combination of lamp and fixture a desirable power factor.

In a second aspect, the invention provides a method of safely operating an electric lamp, in which there is arranged a lighting module with at least two terminals and on the outside of which there are four external connection pins arranged in pairs, each pair being connectable to a respective supply-voltage socket (or outlet). The method includes monitoring the voltage at each pair of connection points. If a non-zero (or above a threshold) voltage is found at a pair of connection pins, then at least one of the pins is connected to a terminal of the lighting module.

Advantageously, the method further comprises the following steps in the case where a pin is currently connected to a terminal. The voltage at the pair, to which the connected connection pin belongs, is monitored continuously. If the voltage drops to zero (or below the threshold), which suggests that the connection pins has been removed from a socket, then it is ensured that no connection pin in said pair is connected to any terminal.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention. On the drawings.

Unless otherwise indicated, like numerals refer to like items on the drawings.

DETAILED DESCRIPTION

Figure 1:
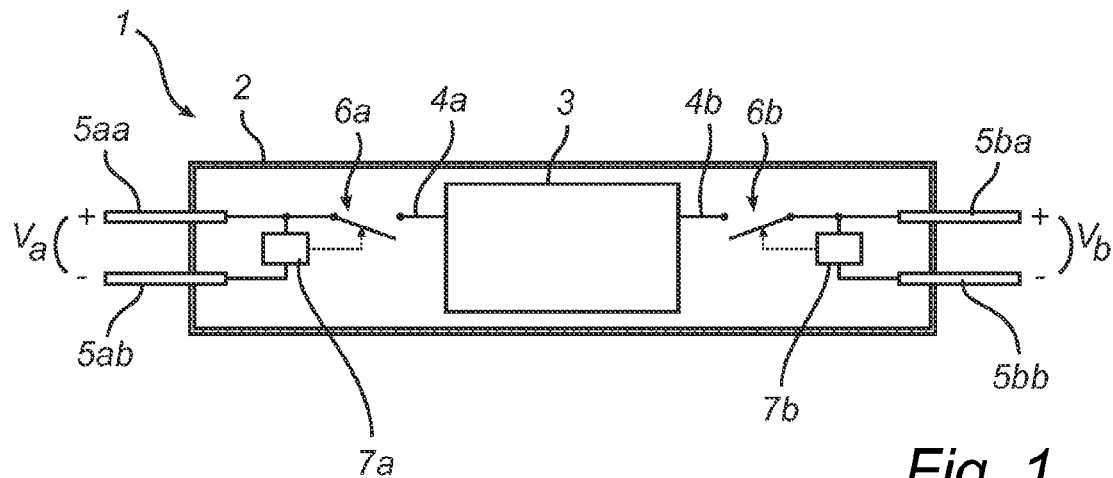
FIG. 1 is a partially schematic longitudinal section of an electric lamp according to a first embodiment of the invention.

FIG. 1 shows a first embodiment of the invention as an electric lamp 1, with a cylindrical shape, particularly a tubular shape. Externally, the lamp 1 comprises a light-transparent and electrically isolating housing 2, through which two connection pins 5 extend on each side. By being embedded in the material of the housing 2, the pins 5 on each side maintain a fixed spacing and relative orientation, and may therefore be said to form a pair. The pair of pins 5 on each side are adapted to be received by an electric socket. A lighting module 3, which is responsible for generating the light to be emitted by the lamp, is arranged inside the housing and comprises two terminals 4. The lighting module 3 may be an LED module for instance for enabling the electric lamp 1 to retrofit a conventional fluorescent lamp, like a TL lamp. Said LED module 3 may comprise an inorganic LED, a plurality of LEDs, an OLED or another type of solid state light source. The lighting module can also be embodied as an incandescent lamp, a fluorescent lamp, an HID lamp, or any other type. In this embodiment, the lighting module 3 is powered by a voltage applied between the two terminals, similarly to a conventional tube lamp in steady state operation. To this end, an automatic switch 6 is arranged between each terminal 4 and an associated pair of connection pins 5. Each automatic switch 6 is controlled by an operatively connected voltage sensor 7, which is in turn, on its input side, electrically connected between the pins 5 in its associated pair of pins, whereby it measures the respective voltages $V_a$, $V_b$ across these connection pins 5. When the left sensor 7a determines that the left voltage $V_a$ has risen above zero (or above a predefined threshold), the left automatic switch 6a closes the connection between the left terminal 4a and one of the left pins 5*aa*. The left switch 6*a* reopens the connection when the left voltage $V_a$ goes down to zero again. The right-side components are configured similarly. Clearly, the lamp 1 realizes an electric separation between external connection pins 5 to which an external voltage is supplied and pins to which no external voltage is applied.

Figure 2:
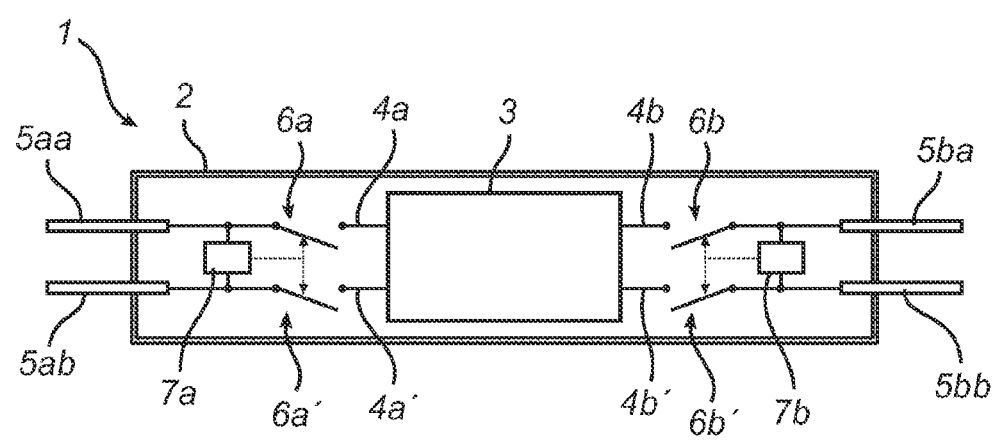
FIG. 2 shows, similarly to FIG. 1, an electric lamp according to a second embodiment of the invention.

FIG. 2 shows a second embodiment, which differs from the lamp of FIG. 1 mainly with respect to the number of terminals 4 of the lighting module 3 and accordingly, with respect to the number of automatic switches 6 provided to connect these to corresponding external connection pins 5. More precisely, the lighting module 3 comprises four terminals 4, which may be connected within the module 3 by a broad range of possible electric networks. On the outside, the present embodiment achieves a non-permanent electric connection of each terminal 4 to a respective connection pin 5 and further, when the pins are inserted into a corresponding socket, to a respective socket terminals within the socket (not shown). Hence, the lighting module 3 may be powered either between two terminals 4 located on opposite sides, or between two terminals 4 on the same side, or by a combination of these. The terminals 4 not used for powering may supply the lighting module 3 with one or more control signals.

Figure 3:
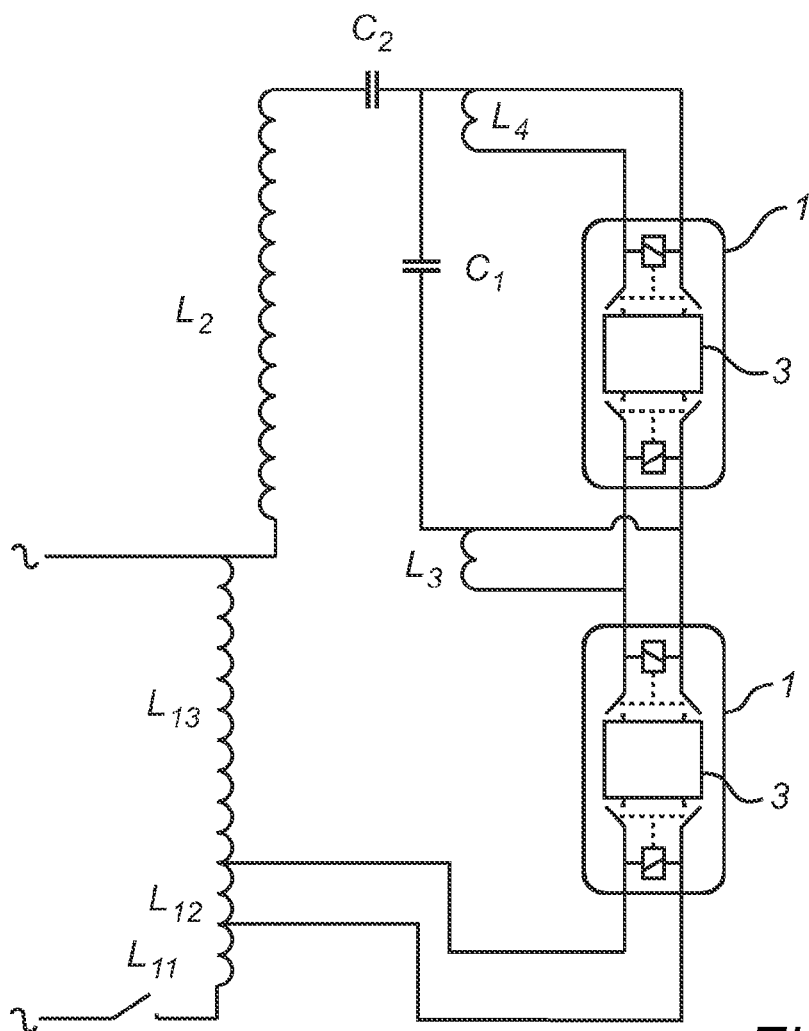
FIGS. 3 and 4 are circuit diagrams showing electric lamps according to embodiments of the invention in use.

As to the electric connections between external connection pins 5 and terminals 4, four automatic switches 6 are provided. Left and right voltage sensors 7 are arranged between pins 5 belonging to the same pair. The left sensor 7*a* controls the two left switches 6*a*, 6*a'*, which are associated with the left pair of connection pins 5*aa*, 5*ab* and which connect the pins 5*aa*, 5*ab* to respective terminals 4*a*, 4*a'* in the closed position of the switches 6*a*, 6*a'*. The right-side sensor 7*b* and switches 6*b*, 6*b'* are configured similarly. FIG. 3 shows two lamps 1 according to an embodiment of the invention fitted in an AC-powered fixture of the rapid-start type. The fixture includes socket terminals for ohmically contacting four external connection pins on each lamp 1. The heating windings $L_{12}, L_3, L_4$ will admit a small AC current to flow between the connection pins at the same end of a lamp 1, so as to achieve the necessary heating of the electrodes. When an arc has established, current may flow between pins on opposite ends of a lamp as well. In the absence of an arc, any socket terminals located on opposite ends of the lamp are not ohmically connected but only via one or both of the capacitors $C_1, C_2$. The automatic switches 6 in a lamp 1 according to the invention will connect at least one external pin 5 on each end to the lighting module 3 in response to the AC voltage that the fixture applies to same-end pins. Once a pin 5 from each end is connected to the lighting module 3, an electric connection between the ends of the lamp will be available, similarly to an arc in a conventional tube lamp, and the lighting module 3 is powered. The switches 6 are maintained closed by the voltage normally driving a small heating current through the electrodes.

Figure 4:
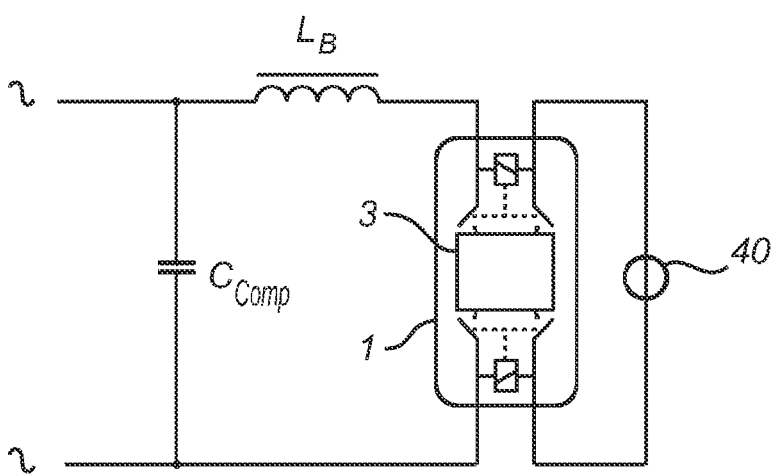

FIG. 4 shows a fixture of the switch-start type comprising, as is common practice, a ballast inductor $L_B$, a compensation capacitor $C_{comp}*$, but wherein the conventional glow starter, which is operable to connect two connection pins on opposite ends of the lamp 1, has been replaced by a dummy starter 40. The dummy starter 40 may be a short (or pass-through). Alternatively, it may include current-limiting means of any per se known type, so as to avoid an excessive current through the power sensing means 7 in the relays or similar devices acting as the automatic switches 6. The functioning of a lamp 1 when correctly inserted in the switch-start fixture includes an short initial phase terminating when the switches 6 close and connect the lighting module to the external connection pins 5 of the lamp 1. After the initial phase, there follows a steady-state phase wherein current flows through the fixture two parallel ways. These facts have been discussed above, and a rule has been given for selecting relays with suitable winding voltages to act as automatic switches 6.

The person skilled in the art realizes that the present invention by no means is limited to the preferred embodiments described above. On the contrary, many modifications and variations are possible within the scope of the appended claims. For example, the invention may be applied to lamps with a different number of external connection pins to bring about an electric isolation between powered and non-powered connection pins. Any reference signs in the claims should not be construed as limiting the scope.

The invention claimed is:

1. A system comprising:
   an electric lamp comprising:
   a lighting module with at least two terminals; and
   four external connection pins arranged in pairs, wherein each pair of connection pins is associated with an automatic switch operable to connect a first connection pin in the pair to a terminal, each switch configured to close in response to non-zero voltage at its associated pair of connection pins,
   and a dummy starter to replace a starter in a switch-start circuit fixture for connecting the electric lamp to mains voltage.

2. The system of claim 1, wherein the electric lamp comprises a further automatic switch operable to connect a second connection pin in a pair to one of said at least two terminals on the lighting module, said further switch configured to close in response to non-zero voltage at its associated pair of connection pins.

3. The system of claim 1, wherein the electric lamp further comprises a further automatic switch operable to connect a second connection pin in a pair to a further terminal on the lighting module, said further switch configured to close in response to non-zero voltage at its associated pair of connection pins.

4. The system of claim 3, wherein:
   the lighting module has four terminals;
   the lamp comprises automatic switches which are operable to connect terminals and connection pins in a one-to-one relationship, each switch being adapted to close in response to non-zero voltage at its associated pair of connection pins.

5. The system of claim 1, wherein the electric lamp further comprises a housing wherein:
   the terminals of the lighting module and the automatic switches are contained in the housing; and
   the four pins extend through the housing.

6. The system of claim 1, wherein the spatial configuration of said four pins is rigid.

7. The system of claim 1, wherein the automatic switch is adapted to open in response to zero voltage at its associated pair of connection pins.

8. The system of claim 1, wherein the automatic switch is an electrically operated switch.

9. The system of claim 8, wherein the electric lamp comprising at least one electric relay for acting as one or more of said automatic switches, wherein the input terminals of each relay are connected to the connection pins in a pair.

10. The system of claim 9, wherein the at least one electric relay is a normally-open relay.

11. The system of claim 10, adapted to replace a fluorescent tube lamp associated with a nominal burn voltage, wherein two electric relays act as said automatic switches and the sum of their winding voltages is approximately equal to the nominal burn voltage.

12. The system according to claim 11, characterized in that the lighting module is an LED module for enabling the electric lamp to retrofit a conventional fluorescent lamp.

13. A kit of parts comprising:
an electric lamp comprising:
a lighting module with at least two terminals; and
four external connection pins arranged in pairs,
wherein each pairs of connection pins is associated with an automatic switch
operable to connect a first connection pin in the pair to terminal, each
switch being adapted to close in response to non-zero voltage at its associated pair of connection pins: and
a dummy starter to replace a starter in a switch-start circuit fixture for connecting a the lamp to mains voltage.

14. The kit of parts of claim 13, wherein the dummy starter comprises a pass-through component.

15. The kit of parts of claim 13, wherein the dummy starter comprises a current-limiting component.

16. A method of safely operating an electric lamp comprising a lighting module with at least two terminals and further comprising four external connection pins arranged in two pairs connectable to respective supply-voltage sockets, the method comprising:
monitoring the voltage at each pair of connection pins; and
connecting, responsive to non-zero voltage at a pair of connection pins, a first connection pin in the pair to a terminal.

17. The method of claim 16, further comprising:
continuously monitoring the voltage at the pair of connection pins, in which a pin is connected to a terminal; and
disconnecting, responsive to zero voltage at said pair of connection pins, the connection pins from any terminals.

* * * * *